United States Patent
Limberg

(10) Patent No.: US 6,184,921 B1
(45) Date of Patent: Feb. 6, 2001

(54) METHOD FOR TRANSMITTING VSB DIGITAL TV WITH CARRIER FREQUENCY NEAR CO-CHANNEL NTSC AUDIO CARRIER FREQUENCY

(75) Inventor: Allen LeRoy Limberg, Vienna, VA (US)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/047,475

(22) Filed: Mar. 25, 1998

Related U.S. Application Data

(60) Provisional application No. 60/075,424, filed on Feb. 20, 1998.

(51) Int. Cl.[7] .................................................. H04N 5/38
(52) U.S. Cl. .......................... 348/21; 348/723; 348/608; 348/725; 348/17
(58) Field of Search .......................... 348/21, 17, 723, 348/724, 608, 725, 845.1, 469, 470; 375/301; H04N 5/38, 5/44

(56) References Cited

U.S. PATENT DOCUMENTS

| | | | |
|---|---|---|---|
| 5,087,975 | * 2/1992 | Citta et al. | 348/21 |
| 5,121,203 | * 6/1992 | Citta | 348/723 |
| 5,243,304 | * 9/1993 | Rixon | 332/170 |
| 5,285,470 | * 2/1994 | Schreiber | 348/723 |
| 5,311,547 | * 5/1994 | Wei | 348/21 |
| 5,408,262 | * 4/1995 | Kim et al. | 348/21 |
| 5,452,015 | * 9/1995 | Hulyalkar | 348/21 |
| 5,512,957 | * 4/1996 | Hulyalkar | 348/21 |
| 5,534,933 | * 7/1996 | Yang | 348/433 |
| 5,559,561 | * 9/1996 | Wei | 348/21 |
| 5,574,496 | * 11/1996 | Nielsen et al. | 348/21 |
| 5,602,583 | * 2/1997 | Citta | 348/21 |
| 5,619,534 | * 4/1997 | Hulyalkar | 375/263 |
| 5,629,958 | * 5/1997 | Willming | 375/295 |
| 5,764,701 | * 6/1998 | Horwitz | 375/301 |
| 5,801,759 | * 9/1998 | Limberg | 348/21 |

* cited by examiner

*Primary Examiner*—Michael Lee
*Assistant Examiner*—Jean W. Désir
(74) *Attorney, Agent, or Firm*—Robert E. Bushnell, Esq.

(57) ABSTRACT

An N-level digitally encoded signal at a symbol rate $f_s$ substantially equal to three times the NTSC color subcarrier frequency, N being a plural integer, modulates a carrier signal of a frequency within a few hundred kilocycles of the NTSC audio carrier, for transmission through a channel subject at times to the presence of a co-channel NTSC analog television signal. The modulation is suppressed-carrier amplitude-modulation generating first and second amplitude-modulation sidebands. Any portion of the amplitude-modulation sidebands extending outside the channel is suppressed in the transmitted signal, thereby making the first amplitude-modulation sideband a vestigial sideband providing an image for only a portion of the second amplitude-modulation sideband closer in frequency to the carrier signal. The amplitude responses of the vestigial sideband and the portion of the second amplitude-modulation sideband closer in frequency to the carrier signal are halved in the transmitted signal compared to the amplitude response of a remaining portion of the second amplitude-modulation sideband further in frequency from the carrier signal. A fixed-amplitude pilot signal of the same frequency as the suppressed carrier is included in the transmitted signal.

12 Claims, 3 Drawing Sheets

METHOD FOR TRANSMITTING VSB DIGITAL TV WITH CARRIER FREQUENCY NEAR CO-CHANNEL NTSC AUDIO CARRIER FREQUENCY

This application is filed under 35 U.S.C. 111(a) claiming pursuant to 35 U.S.C. 119(e)(1) benefit of the filing date of provisional application serial No. 60/075,424 filed Feb. 20, 1998, pursuant to 35 U.S.C. 111(b).

The present invention generally relates to television signal transmission systems and particularly concerns a method of transmitting a vestigial sideband (VSB) digital television signal having reduced susceptibility to NTSC co-channel interference.

BACKGROUND OF THE INVENTION

The specification and drawing of U.S. Pat. No. 5,087,975 issued Feb. 11, 1992 to R. W. Citta et alii and entitled VSB HDTV TRANSMISSION SYSTEM WITH REDUCED NTSC CO-CHANNEL INTERFERENCE are incorporated herein by reference. Citta et alii describe a television signal transmission signal for broadcast television comprising a suppressed carrier, a VSB signal having respective Nyquist slopes at the lower- and upper-frequency edges of a television channel with 6-MHz bandwidth, the center frequency of the Nyquist slope at the lower-frequency edge of the channel being substantially coincident with the frequency of the suppressed carrier, and a pilot signal in quadrature relation with the suppressed carrier. The television signal transmission signal is susceptible to cochannel interference from NTSC television signal with a video carrier 1.25 MHz above the lower-frequency edge of the channel, a color subcarrier 3.58 MHz above the video carrier in frequency, and an audio carrier 0.25 MHz below the upper-frequency edge of the channel. The suppressed carrier is modulated by an N-level digitally encoded signal having a sample rate $f_s$ substantially equal to three times the NTSC color subcarrier frequency, with the frequency of the suppressed carrier being closer to the lower-frequency edge of the channel than the co-channel NTSC picture carrier by an amount equal to about $f_s/12$. The received signal is demodulated by a synchronous detector in response to the received pilot signal and interfering NTSC beat components are attenuated by a linear filter having notches at $f_s/1$, at $5 f_s/12$ and at $f_s/2$.

A Digital Television Standard published Sep. 16, 1995 by the Advanced Television Systems Committee (ATSC) specifies VSB signals for transmitting digital television (DTV) signals in 6-MHz-bandwidth television channels such as those currently used in over-the-air broadcasting of National Television System Committee (NTSC) analog television signals within the United States. These VSB signals differ from those described by Citta et alii in that each uses a pilot signal in phase with its suppressed carrier, rather than in quadrature therewith. These VSB signals each comprise a vestigial sideband near the lower upper-frequency edge of the television broadcast channel and a full sideband extending upward in frequency therefrom to the upper-frequency edge of the channel.

SUMMARY OF THE INVENTION

The invention is directed to the transmitting of a television signal transmission signal comprising a suppressed carrier, a pilot signal in phase with the suppressed carrier, and a VSB signal having its vestigial sideband near the upper-frequency edge of a television broadcast channel and its full sideband near the lower-frequency edge of the channel. The suppressed carrier is modulated by an N-level digitally encoded signal having a sample rate $f_s$ substantially equal to three times the NTSC color subcarrier frequency, with the frequency of the suppressed carrier being further from the lower-frequency edge of the channel than the co-channel NTSC picture carrier by an amount equal to about $5f_s/12$. The received signal can be demodulated by a synchronous detector in response to the received pilot signal and interfering NTSC beat components are attenuated by a linear filter having notches at $f_s/12$, at $f_s/4$ and at $5f_s/12$.

DETAILED DESCRIPTION

Figure 1:
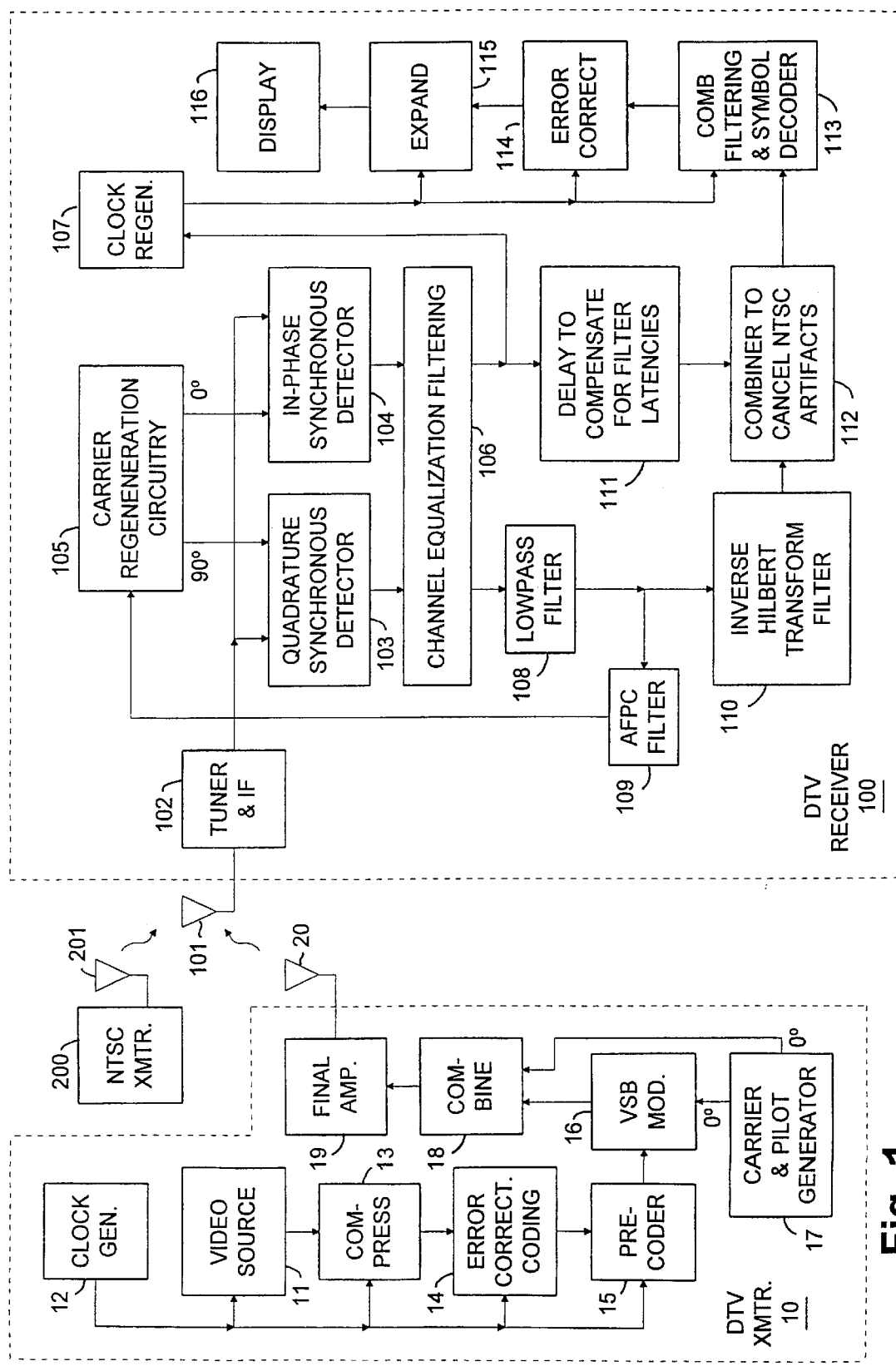
FIG. 1 is a block diagram of a television signal transmission system constructed in accordance with the invention.

The problem addressed by the present invention is generally illustrated in the block diagram of FIG. 1. A DTV transmitter, designated generally by reference numeral 10, broadcasts a DTV encoded signal over a selected 6-MHz-wide television channel for reception and reproduction by a corresponding DTV receiver 100 tuned to the selected channel. At the same time, an NTSC transmitter 200 broadcasts an NTSC encoded signal over the same channel in a nearby television service area. Depending on various factors including its physical location, the DTV receiver 100 may thus receive an undesired interfering component of considerable strength from a transmission antenna 201 of the NTSC transmitter 200 in addition to the desired signal from a transmission antenna 20 of the DTV transmitter 10. Since the undesired interfering signal is transmitted on the same channel as the desired DTV signal, it is commonly referred to as "co-channel interference". The co-channel interfering signal in the DTV receiver especially poses a problem in the case where an all digital DTV transmission standard is employed. In particular, if the co-channel interfering signal is of sufficient strength to overwhelm the digital DTV signal in the receiver, the ability of the receiver to reproduce an image of any quality may be completely compromised. Moreover, this impairment of the DTV receiver may arise quite abruptly with variations in the strength of the interfering NTSC co-channel signal. This is in contrast to analog DTV transmission systems in which variations in the strength of the interfering NTSC co-channel signal cause gradual changes in the signal-to-noise performance of the receiver.

As known, the spectrum of the interfering NTSC co-channel signal occupies a 6-MHz-wide television channel and includes a luma component, a chroma component and an audio component. The luma component has a bandwidth of about 4.2 MHz and is modulated on a picture carrier spaced 1.25 MHz from one end of the channel. The chroma component, which has a bandwidth of about 1 MHz, is modulated on a subcarrier spaced about 3.58 MHz from the picture carrier. The audio component is modulated on a carrier spaced 0.25 MHz from the other end of the channel (i.e., 4.5 MHz from the picture carrier). Major contributors to co-channel interference are the relatively large NTSC picture carrier and sidebands thereof encoding sync information and high-luma image components, color burst, chroma subcarrier sidebands during high-chroma image components, and the FM audio carrier.

NTSC picture carrier peaks during sync intervals provide the highest energy co-channel interference. When comb filtering is used to suppress NTSC co-channel interference, it is desirable for the comb filtering be designed for best suppression of artifacts of the NTSC video carrier and its 15,734 Hz sidebands. Chroma burst has only 20% or less of the energy NTSC picture carrier peaks have during sync intervals. Comb filtering can suppress artifacts of NTSC luma and chroma signals descriptive of large areas in the image. The errors introduced by artifacts of NTSC luma and chroma signals descriptive of moving edges in the image have to be corrected using error correcting codes.

While constrained in amplitude to about 7–10% of video carrier peak modulation, the FM audio carrier is of sustained amplitude. This makes it difficult to use error-correcting codes for correcting errors introduced by the FM audio carrier. The frequency and phase modulation of the NTSC audio carrier makes comb filtering using differential delay of more than a few symbol epochs impractical for suppressing artifacts of NTSC audio signal. The fact that modulation signals vary at audio and low supersonic rates provides enough correlation between samples only a few symbol epochs apart permits the 12-symbol-differential-delay comb filters used for ATSC signals to have some success in suppressing artifacts of NTSC audio signal.

Figure 2:
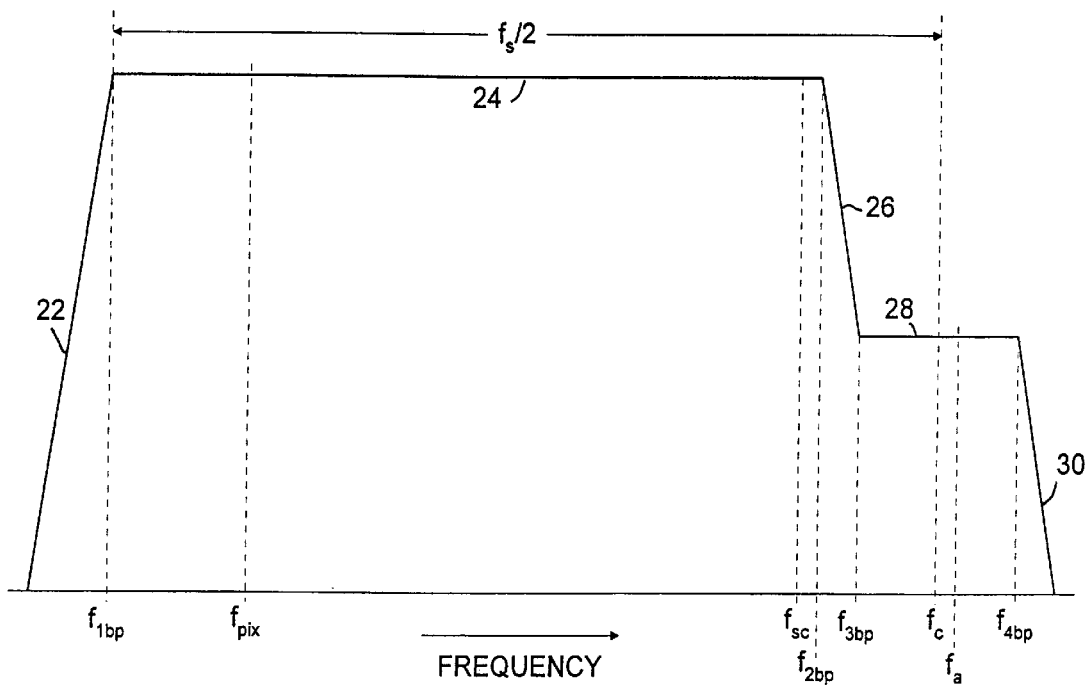
FIG. 2 is a graph illustrating the spectrum of a 6 MHz DTV television channel when DTV transmissions are made in accordance with the invention.

FIG. 2 illustrates the spectrum of a DTV transmission channel according to the present invention. The channel is 6 MHz wide, corresponding to an NTSC transmission channel through which a VSB signal is transmitted as illustrated. More particularly, below a first breakpoint frequency $f_{1bp}$ no more than 353 kHz or so from the lower-frequency edge of the transmission channel, the transmission channel exhibits an amplitude response roll-off 22. The VSB signal has a substantially flat amplitude response portion 24 extending from the first breakpoint frequency $f_{1bp}$ to a second breakpoint frequency $f_{2bp}$ somewhat less than 5,643 kHz or so from the lower-frequency edge of the transmission channel. The picture carrier frequency $f_{pix}$ of a co-channel interfering NTSC signal 1,250,00 Hz from the lower-frequency edge of the transmission channel, is within the frequency range comprehended by this substantially flat amplitude response portion 24. The chroma subcarrier $f_{sc}$ of a co-channel interfering NTSC signal 4,829,545.5 Hz from the lower-frequency edge of the transmission channel, is preferably within this frequency range as well. Between the second breakpoint frequency $f_{2bp}$ and a third breakpoint frequency $f_{3bp}$ the transmission channel exhibits a roll-off 26 in amplitude response to one-half the amplitude response through the substantially flat amplitude response portion 24, which halved amplitude response extends as another substantially flat amplitude response portion 28 from the third breakpoint frequency $f_{3bp}$ to a fourth breakpoint frequency $f_{4bp}$. The halving is in the degree of modulation, not in energy.

The suppressed carrier frequency $f_c$ and pilot signal frequency $f_p$ of the DTV signal are both at a frequency slightly less than 5,734 kHz from the lower-frequency edge of the transmission channel to position them slightly less than 285 times NTSC horizontal scan frequency $f_h$ above the NTSC picture carrier frequency $f_{pix}$. This is done to best accommodate comb filtering in the receiver 100 to suppress artifacts of the picture carrier frequency $f_{pix}$ and chroma subcarrier $f_{sc}$ of a co-channel interfering NTSC signal. The suppressed carrier frequency $f_c$ and pilot signal frequency $f_p$ of the DTV signal are at the center of the frequency range comprehended by the substantially flat amplitude response portion 28. The substantially flat amplitude response portion 28 extends to include frequency-modulated audio carrier $f_a$ of a co-channel interfering NTSC signal and its frequency-modulation sidebands of significant energy. Accordingly, the fourth breakpoint frequency $f_{4bp}$ is positioned 5,825,000 Hz or slightly more from the lower-frequency edge of the transmission channel. Above the fourth breakpoint frequency $f_{4bp}$ the transmission channel exhibits an amplitude response roll-off 30. The third breakpoint frequency $f_{3bp}$ is as much below the suppressed carrier frequency $f_c$ in frequency as the fourth breakpoint frequency $f_{4bp}$ is above. The roll-off 26 in amplitude response between the second breakpoint frequency $f_{2bp}$ and third breakpoint frequency $f_{3bp}$ is designed to complement the roll-off 30 in amplitude response, so when the television signal transmission signal is demodulated in the receiver 100 the baseband DTV signal has a flat amplitude response from zero frequency up to a frequency half the Nyquist sampling frequency $f_s$—i.e., up to 5,381,118.9 Hz. The transmitter phase response is maintained linear through the frequency range extending from less than 353 kHz or so from the lower-frequency edge of the transmission channel to the frequency at which the roll-off 30 in amplitude response has reduced energy at high frequencies to negligible level, so that absent multi-path phenomena there will be uniformity of group delay in DTV signal components demodulated by the receiver 100.

As pointed out in U.S. Pat. No. 5,087,975, the Nyquist bandwidth $f_s/2$ of the channel can be thought of as being divided into six equal parts, with the interval between the co-channel NTSC picture carrier $f_{pix}$ and color subcarrier $f_{sc}$ corresponding to four of these six parts. i.e., $f_{sc}-f_{pix}=(4/6)(f_s/2)=(4/12)$ $f_s=(1/3)f_s$. The Nyquist symbol frequency is initially presumed to be three times $(f_{sc}-f_{pix})=3*3,579,545.5$ Hz=10,738,636.4 Hz.

In contrast to what is shown in U.S. Pat. No. 5,087,975, the interval between the suppressed carrier frequency $f_c$ of the DTV signal and the co-channel NTSC picture carrier $f_{pix}$ corresponds to five of the six parts, rather than just one of these six parts, and the interval between the suppressed carrier frequency $f_c$ of the DTV signal and the co-channel NTSC color subcarrier $f_{sc}$ corresponds to only one of the six parts, rather than five of these six parts. i.e., $f_c-f_{pix}=(5/6)(f_s/2)=(5/12)$ $f_s$, and $f_c-f_{sc}=(1/6)(f_s/2)=(1/12)$ $f_s$.

Figure 3:
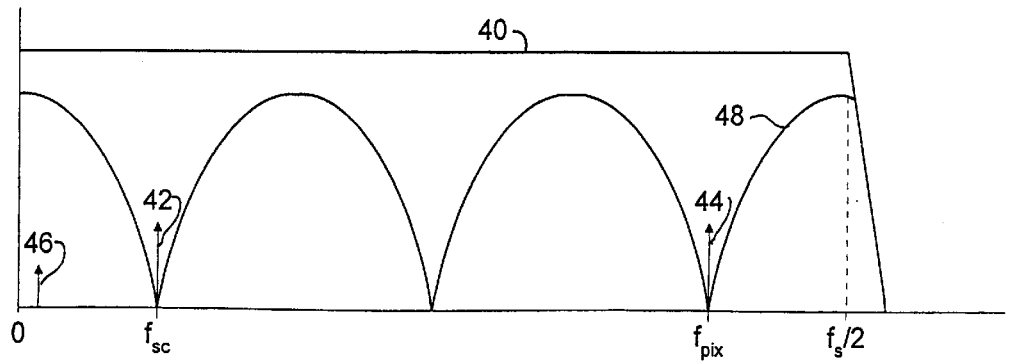
FIG. 3 is a graph illustrating the response of a DTV receiver to co-channel DTV and NTSC transmissions, when the DTV transmissions are made in accordance with the invention.

FIG. 3 depicts the baseband response of DTV receiver 100. As illustrated in this figure, the nominal response 40 of the DTV receiver is substantially flat across the channel, and accommodates the Nyquist bandwidth of fs/2 without attenuation. The baseband DTV signal is preferably produced by an "in-phase" synchronous detector in response to a regenerated carrier having a frequency and phase corresponding to the suppressed DTV carrier $f_c$. In the presence of an NTSC co-channel signal, detection in response to the regenerated carrier may also provide a pair of interfering beat signals at frequencies corresponding substantially to fs/12 and 5fs/12 arising respectively from the chroma subcarrier and the video carrier of co-channel NTSC interference. The interfering beat signals are represented in FIG. 3 by reference numerals 42 and 44, respectively. Another beat signal 46 slightly above zero frequency appears in the "in-phase" synchronous detector response as an artifact of the NTSC FM audio carrier. A comb filter that additively combines baseband DTV signals having appropriate differential delay has a response 50 with nulls 52, 54 and 56 in its response. The null 54 is near mid-channel and reduces mid-channel ringing response to impulse noise. The beat signals 42 and 44 that are the artifacts of the chroma subcarrier and the video carrier of co-channel NTSC interference are suppressed by the nulls 52 and 56 in the comb filter response 50. As will be explained in further detail hereinafter, receiver 100 includes a comb filter having the response 50, for reducing the effect of the co-channel interference beats.

The ATSC Digital Television Standard makes the symbol rate $f_s$ 684 times the NTSC horizontal scanning rate $f_h$ to facilitate conversion between NTSC and DTV encoded signals, as suggested in U.S. Pat. No. 5,087,975. Accordingly, a linear comb filter additively combining samples differentially delayed by a six symbol interval provides a response including respective notches 52 and 56 at frequencies close to those of the beat signals 42 and 44. Since an NTSC horizontal scan line has exactly 684 symbols therein, a 6-symbol delay will be 114 times shorter than an NTSC scan line. An artifact having a frequency $114*f_h$ will have one complete cycle in the 6-symbol period, so the comb filter additively combining samples differentially delayed by a six symbol interval has its notches at 1,793,706.3 Hz intervals.

If the video carrier frequency $f_{pix}$ were to fall exactly into the notch at $(5/2)*1,793,706.3$ Hz, the DTV carrier frequency $f_c$ would be $(5/2)*1,793,706.3$ Hz above the video carrier frequency $f_{pix}$ that is 1,250,000 Hz above the lower frequency limit of the channel. i.e., the DTV carrier frequency $f_c$ would be 5,734,265.7 Hz above the lower frequency limit of the channel and 265,734.3 Hz below the upper frequency limit of the 6-MHz-wide channel. This would put the DTV signal carrier frequency $f_c$ at $f_h$ horizontal frequency offset from the NTSC audio carrier frequency $f_a$, so the DTV signal carrier would be inaudible in an NTSC television signal receiver, even if the amplitude-modulation (AM) rejection of its sound circuitry were poor. The problem with doing this is that the first upper sideband of the stereophonic pilot carrier in the NTSC co-channel interfering signal will tend to affect the acquisition of DTV carrier frequency in a DTV receiver if the DTV signal carrier frequency $f_c$ has an $f_h$ horizontal frequency offset from the NTSC audio carrier frequency $f_a$.

It is preferable that the DTV carrier frequency $f_c$ be slightly lower in frequency—e.g., 5,733,500 Hz above the lower frequency limit of the channel and 266,500 Hz below the upper frequency limit of the 6-MHz-wide channel. This permits the beat between the DTV carrier frequency $f_c$ and the first upper sideband of the stereophonic pilot carrier in the NTSC co-channel interfering signal to be about 765 Hz, so it can be rejected by a narrowband filter in the AFPC signal of the carrier regeneration circuitry. The DTV signal carrier will remain inaudible in an NTSC television signal receiver, even if the amplitude-modulation (AM) rejection of its sound circuitry is poor.

The DTV carrier frequency $f_c$ can be placed at $57*f_h$ below the frequency of co-channel NTSC chroma subcarrier, which is 273,602 Hz below the upper frequency limit of the 6-MHz-wide channel. The DTV signal carrier may cause a 7867 Hz tone in an NTSC television signal receiver with stereophonic sound, if the amplitude-modulation (AM) rejection of its sound circuitry is poor. The acquisition of DTV carrier frequency in a DTV receiver will be unaffected by co-channel NTSC stereophonic pilot signal, and chroma sidebands will be best suppressed. Co-channel NTSC video artifacts will be $f_h/2$ from the notch frequency of the comb filter used for rejecting NTSC artifacts. A comb filter employing 6-symbol differential delay provides—18 dB rejection over a 71 kHz range including the notch frequency, so rejection of co-channel NTSC video carrier artifacts will still be reasonably good. Then, too, co-channel NTSC video carrier artifacts can be cancelled by methods other than comb filtering since the double-sideband nature of the NTSC signal up to 750 kHz permits its separation from VSB DTV signal.

In accordance with the foregoing, and referring back to FIG. 1, the DTV transmitter 10 comprises a video source 11 receiving a clock signal $f_s$ from a clock generator 12 to provide a digital video signal having a bandwidth of up to about 37 MHz at a symbol rate of $f_s$, where $f_s$ is nominally equal to $3f_{sc}$. The symbol rate is presumed to be 684 times the NTSC horizontal rate $f_h$. By way of example, the video signal provided by source 11 comprises 787.5 progressively scanned lines per frame, 720 of which represent active video, having a vertical repetition rate corresponding to the NTSC field rate and a horizontal repetition rate corresponding to three times the NTSC horizontal scanning rate. The video signal developed by source 11 is applied to a video compressor 13 which compresses the 37 MHz video signal sufficiently to allow for its transmission through a television channel of 6-MHz bandwidth. The compressed video signal can then be subjected to forward error correction coding in error correction coding (ECC) circuitry 14 with the ECC results being supplied to precoder circuitry 15. The ECC circuitry 14 comprises a Reed-Solomon coder followed by a trellis coder and precoding is applied to selected symbols in the trellis coding result, in accordance with accepted practice under the ATSC Digital Television Standard. The video compressor 13, the ECC circuitry 14 and the precoder circuitry 15 are operated in response to clock signal $f_s$ from clock generator 12. The precoder circuitry 15 supplies partially pre-coded error-corrected coding results as modulating signal to a vestigial-sideband amplitude modulator 16. Carrier and pilot signal generation circuitry 17 supplies the VSB modulator 16 with a carrier signal having a nominal frequency $f_h$ horizontal frequency offset lower than the corresponding NTSC audio carrier frequency $f_a$. Carrier and pilot signal generation circuitry 17 also supplies a pilot signal of frequency $f_p$ of the same frequency and phase as the carrier signal. The pilot signal is combined with the vestigial-sideband amplitude-modulation output signal from the VSB modulator 16 in a combining circuit 18 to form a signal for application to the final amplifier circuitry 19 used for driving the transmission antenna 20. The video signal is transmitted as a sequence of N-level data samples, with the transmission preferably being effected in the form of a suppressed carrier, VSB signal as illustrated in FIG. 2, with an in-phase pilot signal $f_p$ being combined therewith to facilitate regeneration of the carrier in the DTV receiver 100. The frequencies of the clock and carrier signals can, of course, be slightly adjusted from the nominal values previously described.

The DTV receiver 100 includes a reception antenna 101 tuner and IF stage 102 tuned to the 6 MHz television channel over which the DTV signal is transmitted. The tuned DTV signal, together with a co-channel NTSC signal broadcast on the same channel by transmitter 200 in a nearby television service area, are converted to an intermediate frequency in stage 102 and supplied as input signal to an in-phase synchronous detector 103 and a quadrature-phase synchronous detector 104. Carrier regeneration circuitry 105 supplies in-phase regenerated carrier and quadrature-phase regenerated carrier to the in-phase synchronous detector 103 and to the quadrature-phase synchronous detector 104, respectively. The baseband responses of the synchronous detectors 103 and 104 are supplied to channel equalization filtering 106, which suppresses multi-path responses to the DTV signal received from the DTV transmitter 10 and equalizes the channel to reduce intersymbol error. The delayed equalized in-phase synchronous detector 103 response from the channel equalization filtering 106 is supplied to clock regeneration circuitry 107 which regenerates symbol clock signal $f_s$ for use throughout the DTV receiver 100.

A lowpass filter 108 responds to the equalized quadrature-phase synchronous detector 104 response from the channel equalization filtering 106 to generate an error signal indicative of any departure from correct frequency and phasing of the in-phase regenerated carrier and quadrature-phase regenerated carrier supplied to the in-phase synchronous detector 103 and to the quadrature-phase synchronous detector 104 by the carrier regeneration circuitry 105. This error signal is further filtered by an AFPC filter 109 to be used as automatic frequency and phase control (AFPC) signal for a controlled oscillator included in the carrier regeneration circuitry 105.

The equalized quadrature-phase synchronous detector 104 response from the channel equalization filtering 106 contains response to all the single-sideband components of the VSB DTV signal which is the Hilbert transform of the response to all the single-sideband (SSB) components of the VSB DTV signal contained in the equalized in-phase synchronous detector 103 response from the channel equalization filtering 106. The response of the lowpass filter 108 to the equalized quadrature-phase synchronous detector 104 response from the channel equalization filtering 106 is supplied to an inverse Hilbert transform filter 110, which responds to supply response to the lower-frequency SSB components of the VSB DTV signal similar to the equalized in-phase synchronous detector 103 response to these lower-frequency SSB components except for the latency or delay introduced by the inverse Hilbert transform filter 109. The equalized in-phase synchronous detector 103 response from the channel equalization filtering 106 is delayed by a delay line 111, which compensates for the latencies or delays introduced by the filters 108 and 110. The response of the cascaded filters 108 and 110 is combined with the delay line 111 response in a linear combiner 112 to cancel the artifacts of co-channel NTSC audio signal from the delayed equalized in-phase synchronous detector 103 response supplied from the linear combiner 112 to comb filtering and symbol decoder circuitry 113.

The delayed equalized in-phase synchronous detector 103 response supplied from the linear combiner 112 includes the desired DTV component represented by curve 40 of FIG. 3, and the undesired NTSC co-channel video and chroma beat components respectively represented by signals 42 and 44 of FIG. 3. As described previously, the beat components occur at frequencies substantially corresponding to fs/12 and 5fs/12 and are produced as a result of beating the regenerated DTV carrier with the NTSC video carrier and the NTSC chroma subcarrier, respectively. Data slicing in the symbol decoder circuitry 113 is clocked by the symbol clock signal $f_s$ regenerated by the clock regeneration circuitry 107. When NTSC co-channel interference is determined to exist, the symbol decoder circuitry 113 can precede data slicing by filtering with a linear filter having a response represented by curve 48 of FIG. 3. This response includes a null at frequencies corresponding to both fs/12 and 5fs/12 to cancel or substantially cancel both the interfering NTCS video and chroma beats. The intersymbol interference introduced by such a filter being used before data slicing can be compensated for in the data recovered by data slicing. The comb filtering and symbol decoder circuitry 113 is preferably of a type described by the inventor in his allowed U.S. Pat. application Ser. No. 08/882,539 filed Jun. 25, 1997, entitled DIGITAL TV RECEIVER CIRCUITRY FOR DETECTING AND SUPPRESSING NTSC CO-CHANNEL INTERFERENCE, and incorporated herein by reference.

The data recovered by the comb filtering and symbol decoder circuitry 113 are supplied to error correction circuitry 114 comprises a trellis decoder followed by a Reed-Solomon decoder. Data slicing in the comb filtering and symbol decoder circuitry 113 can be adjusted in response to the trellis decoder for implementing optimal Viterbi decoding. The error correction circuitry 114 supplies the corrected data to an expansion circuit 115 for reconstructing a wide-band video signal representing the original 37 MHz video source signal. The reconstructed signal is applied to a display 116 for displaying the reconstructed image. The video compressor 13 and the expansion circuit 115 used with the current ATSC standard follow the MPEG-II standard.

Figure 4:
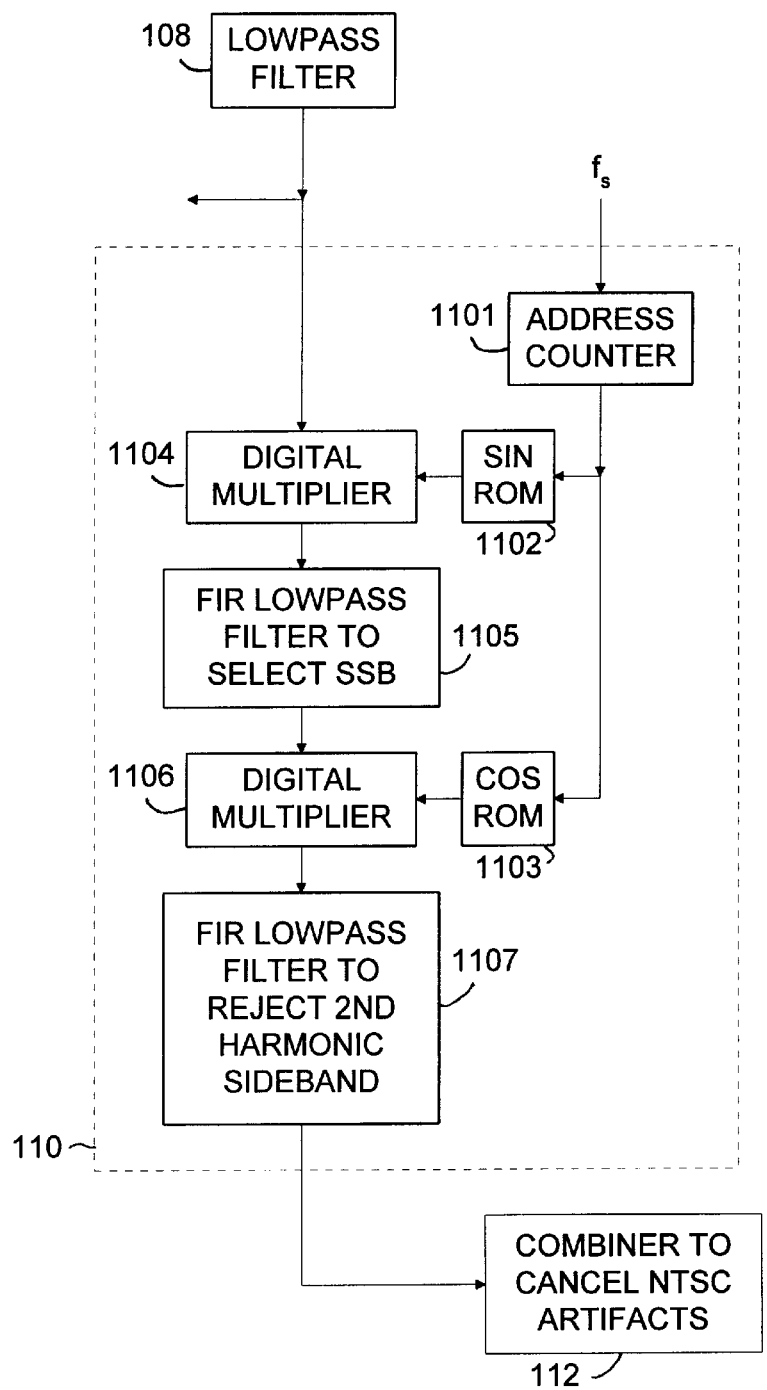
FIG. 4 is a block diagram of an inverse Hilbert transform filter useful in the DTV receiver of FIG. 1.

FIG. 4 shows in detail a specific construction of the inverse-Hilbert-transform filter 110 comprising elements 1101–1107, which construction is preferred because its latency time can be kept reasonably short. If one attempts to construct an inverse-Hilbert-transform filter at baseband the delays associated with obtaining a 90° shift at low frequencies becomes prohibitively long. Therefore, the lowpass filter 108 response is upconverted in frequency before inverse Hilbert transform filtering, and the results of the inverse Hilbert transform filtering are then downconverted in frequency to provide inverse-Hilbert-transformed lowpass filter response at baseband. Symbol epochs are counted by an address counter 1101 to generate consecutive addresses in a modular arithmetic for addressing a sine-table read-only memory 1102 and a cosine-table read-only memory 1103. The sine-table ROM 1102 responds to its addressing to generate a digital carrier wave at a frequency more than 6 MHz (such as 8071678 Hz=513/286 times 4.5 MHz, for example) applied as multiplier input signal to a digital multiplier 1104. The digital multiplier 1104 is connected to receive lowpass filter 108 response as multiplicand input signal and to upconvert that signal to amplitude modulation sidebands of a double-sideband amplitude-modulated digital carrier wave. The digital multiplier 1104 is connected to apply this DSB AM digital carrier wave to a finite-impulse-response (FIR) lowpass digital filter 1105 as input signal. Filter 1105 is designed to be responsive to the lower-frequency AM sideband to supply a single-sideband amplitude-modulated (SSB AM) digital carrier wave, but to be essentially non-responsive to the upper-frequency AM sideband. The cosine-table ROM 1103 responds to its addressing to generate a digital carrier wave at the same frequency as that generated from the sine-table ROM 1102, but in quadrature phase therewith. A digital multiplier 1106 is connected to receive the digital carrier wave generated from the cosine-table ROM 1103 as its multiplier input signal and the SSB AM digital carrier wave response from the filter 1105 as multiplicand input signal. The digital multiplier 1106 is connected to apply its product output signal as input signal to a finite-impulse-response (FIR) lowpass digital filter 1107, which responds to a baseband downconversion result portion of that product signal while rejecting the image upconversion result portion of that product signal to sidebands of a second harmonic of the digital carrier wave supplied from the cosine-table ROM 1103. The baseband response of the lowpass filter 1103 is the inverse-Hilbert-transformed lowpass filter 108 response applied to the combiner 112 as one of its input signals.

The twelve parallel trellis codes specified by the ATSC Digital Television Standard would be better replaced by six parallel trellis codes. However, even if the twelve parallel trellis codes are retained and comb filtering with 12-symbol differential delay is employed to suppress artifacts of NTSC co-channel interference, positioning of the DTV carrier near the upper limit frequency of the broadcast television channel permits the artifacts of co-channel NTSC sound signal to be suppressed better taking advantage of the double-sideband properties of the VSB DTV signal near its carrier frequency.

In an embodiment of the invention other than a preferred embodiment, the amplitude responses of the vestigial sideband and the portion of the full amplitude-modulation sideband closer in frequency to the carrier signal in the transmission signal are similar to the amplitude response of the remaining portion of the full amplitude-modulation sideband further in frequency from the carrier signal. To obtain a flat amplitude response for DTV baseband signal the inverse-Hilbert- transformed high-frequency portion of the quadrature-phase synchronous detector response can be constructively combined with the in-phase synchronous detector response. The channel equalization problems encountered with this approach are avoided with the preferred method of transmitting VSB DTV signal. More of the filtering to shape channel response is done at the broadcast transmitter so filtering at the DTV receiver can be simpler.

What has been shown is a high definition television transmission system which substantially reduces NTSC co-channel interference without significantly degrading DTV receiver performance. The system shown is capable of application to numerous types of digital processing formats for high definition television systems.

What is claimed is:

1. A method of transmitting a digital television signal through a channel subject at times to the presence of a co-channel NTSC analog television signal having a modulated video carrier, a modulated color subcarrier, and a modulated audio carrier, said method comprising steps of:
    providing an N-level digitally encoded signal at a symbol rate $f_s$ substantially equal to three times the NTSC color subcarrier frequency, N being a plural integer;
    generating a carrier signal having a nominal frequency offset below the co-channel NTSC audio carrier frequency by a frequency corresponding to a NTSC horizontal scanning rate;
    modulating the amplitude of said carrier signal with said N-level digitally encoded signal to generate first and second amplitude-modulation sidebands; and
    forming a transmission signal in response to said amplitude-modulation sidebands.

2. The method of claim 1 wherein said carrier signal is generated offset in frequency from said NTSC color subcarrier by an amount substantially equal to one fourth the NTSC color subcarrier frequency and offset from said NTSC video carrier by an amount substantially equal to five fourths the NTSC color subcarrier frequency.

3. The method of claim 1 wherein said N-level digitally encoded signal is provided at a symbol rate 684 times the NTSC horizontal scanning frequency.

4. The method of claim 1 wherein said step of forming a transmission signal comprises substeps of:
    suppressing in said transmission signal any portion of said amplitude-modulation sidebands extending outside said channel, thereby making said first amplitude-modulation sideband a vestigial sideband providing an image for only a portion of said second amplitude-modulation sideband closer in frequency to said carrier signal; and
    halving the amplitude responses of said vestigial first sideband and said portion of said second amplitude-modulation sideband closer in frequency to said carrier signal in said transmission signal compared to the amplitude response of a remaining portion of said second amplitude-modulation sideband further in frequency from said carrier signal.

5. The method of claim 4 wherein said step of forming a transmission signal comprises a further substep of:
    including a fixed amplitude of said carrier signal in said transmission signal as a pilot signal.

6. A method of transmitting a digital television signal through a channel subject at times to the presence of a co-channel NTSC analog television signal having a modulated video carrier, a modulated color subcarrier, and a modulated audio carrier, said method comprising steps of:
    providing an N-level digitally encoded signal at a symbol rate $f_s$ substantially equal to three times the NTSC color subcarrier frequency, N being a plural integer;
    generating a suppressed carrier signal having a frequency offset below the co-channel NTSC audio carrier frequency by a frequency corresponding to a NTSC horizontal scanning frequency;
    generating a pilot signal having a frequency and phase equal to the frequency and phase of said carrier signal;
    modulating the amplitude of said carrier signal with said N-level digitally encoded signal to generate a vestigial-sideband amplitude-modulation output signal; and
    forming a transmission signal by combining said pilot signal and said vestigial-sideband amplitude-modulation output signal.

7. The method of claim 6, wherein said N-level digitally encoded signal is provided at a symbol rate 684 times said NTSC horizontal scanning frequency.

8. A method of transmitting a digital television signal over a 6 MHz television channel comprising steps of:
    providing an N-level digitally encoded signal at a sample rate fs substantially equal to three times a co-channel NTSC color subcarrier frequency;
    generating a carrier signal having a frequency greater than a frequency of a co-channel NTSC picture carrier and less than a frequency of a co-channel NTSC audio carrier;
    modulating said carrier signal with said N-level digitally encoded signal for forming a vestigial-sideband amplitude-modulation output signal;
    generating a pilot signal having a frequency and phase equal to the frequency and phase of said carrier signal; and
    combining said pilot signal and said vestigial-sideband amplitude-modulation output signal.

9. The method as set forth in claim 8, wherein said N-level digitally encoded signal is provided at a symbol rate 684 times a NTSC horizontal scanning frequency.

10. The method as set forth in claim 8, wherein said carrier signal is approximately 266.5 KHz below an upper frequency limit of said 6 MHz television channel.

11. The method as set forth in claim 8, wherein said carrier signal is approximately 265,734.5 Hz below an upper frequency limit of said 6 MHz television channel.

12. The method as set forth in claim 8, wherein said carrier signal is offset below the co-channel NTSC audio carrier frequency by a frequency corresponding to a NTSC horizontal scanning frequency.

* * * * *